(12) United States Patent  
Bernett et al.

(10) Patent No.: US 7,362,541 B2
(45) Date of Patent: Apr. 22, 2008

(54) TWO-STAGE SEALING OF A DATA STORAGE ASSEMBLY HOUSING TO RETAIN A LOW DENSITY ATMOSPHERE

(75) Inventors: Frank W. Bernett, Longmont, CO (US); George I. Brent, Boulder, CO (US); Jason A. Sorrell, Denver, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/748,420

(22) Filed: May 14, 2007

(65) Prior Publication Data

US 2007/0268621 A1    Nov. 22, 2007

Related U.S. Application Data

(62) Division of application No. 10/185,797, filed on Jun. 27, 2002, now Pat. No. 7,218,473.

(60) Provisional application No. 60/366,972, filed on Mar. 22, 2002.

(51) Int. Cl.
*G11B 33/14* (2006.01)
*G11B 33/12* (2006.01)

(52) U.S. Cl. .................. 360/97.02; 720/648

(58) Field of Classification Search .. 360/97.01–97.04; 720/648
See application file for complete search history.

(56) References Cited

U.S. PATENT DOCUMENTS

| 1,369,919 | A | 3/1921 | Eliel |
| 3,047,703 | A | 7/1962 | Aske |
| 4,110,506 | A | 8/1978 | Cottingham |
| 4,367,503 | A | 1/1983 | Treseder |
| 4,488,192 | A | 12/1984 | Treseder |
| 4,556,969 | A | 12/1985 | Treseder et al. |

(Continued)

FOREIGN PATENT DOCUMENTS

JP          60045990 A      3/1985

(Continued)

OTHER PUBLICATIONS

"Addition of Carbon Dioxide and Water Vapor to Helium Atmosphere in a Hermetically Sealed Magnetic Recording Disk File," Jul. 1985, IBM Technical Disclosure Bulletin, vol. 28, Iss. No. 2, p. 503.*

*Primary Examiner*—William J Klimowicz
(74) *Attorney, Agent, or Firm*—Fellers, Snider, et al.

(57) ABSTRACT

In accordance with various embodiments, a data storage device comprises a sealed housing which encloses a data storage medium. The sealed housing comprises a substantially planar first housing plate with respective length, width and thickness dimensions and a circumferentially extending first peripheral edge, a substantially planar second housing plate with a circumferentially extending second peripheral edge, and a circumferentially extending first sealing member contactingly disposed between the respective first and second peripheral edges. A substantially planar third housing plate extends adjacent the first planar housing plate with respective length and width dimensions substantially corresponding to the length and width dimensions of the first housing plate, and a circumferentially extending third peripheral edge. A circumferentially extending second seal member is contactingly disposed between the second and third peripheral edges to form a hermetic seal for the low density gas.

20 Claims, 8 Drawing Sheets

U.S. PATENT DOCUMENTS

| | | | |
|---|---|---|---|
| 4,560,428 A | 12/1985 | Sherrick |
| 4,665,309 A | 5/1987 | Derbyshire |
| 4,771,151 A | 9/1988 | Pursell |
| 4,825,316 A | 4/1989 | Kishi et al. |
| 4,980,786 A | 12/1990 | O'Sullivan et al. |
| 5,223,996 A | 6/1993 | Read et al. |
| 5,317,462 A | 5/1994 | Kakizaki |
| 5,421,943 A | 6/1995 | Tam et al. |
| 5,422,766 A | 6/1995 | Hack |
| 5,454,157 A | 10/1995 | Ananth et al. |
| 5,601,125 A | 2/1997 | Parsoneault et al. |
| 5,624,750 A | 4/1997 | Martinez et al. |
| 5,671,103 A | 9/1997 | Tada |
| 5,696,648 A | 12/1997 | Jeong |
| 5,732,459 A | 3/1998 | Shiraishi et al. |
| 5,793,566 A | 8/1998 | Scura |
| 6,031,729 A | 2/2000 | Berkely et al. |
| 6,058,335 A | 5/2000 | Kim |
| 6,164,837 A | 12/2000 | Haake et al. |
| 6,178,059 B1 | 1/2001 | Frees |
| 6,303,288 B1 | 10/2001 | Furcht et al. |
| 6,317,286 B1 | 11/2001 | Murphy |
| 6,373,654 B1 | 4/2002 | Iwahara |
| 6,392,838 B1 | 5/2002 | Hearn |
| 6,423,938 B1 | 7/2002 | Murari et al. |
| 6,430,000 B1 | 8/2002 | Rent |
| 6,436,853 B2 | 8/2002 | Lin et al. |
| 6,525,899 B2 | 2/2003 | Hearn |
| 6,785,089 B2 | 8/2004 | Bernett et al. |
| 7,016,145 B2 | 3/2006 | Gunderson et al. |
| 7,218,473 B2 * | 5/2007 | Bernett et al. ........... 360/97.02 |
| 2002/0029461 A1 | 3/2002 | Kamigama et al. |
| 2002/0040518 A1 | 4/2002 | Butts et al. |
| 2002/0044376 A1 | 4/2002 | Serizawa |
| 2002/0089782 A1 | 7/2002 | Hearn |
| 2002/0114104 A1 | 8/2002 | Hearn |
| 2002/0153672 A1 | 10/2002 | Caplain |
| 2003/0179489 A1 | 9/2003 | Bernett et al. |
| 2003/0214748 A1 | 11/2003 | Fioravanti |
| 2003/0223148 A1 | 12/2003 | Macleod et al. |

FOREIGN PATENT DOCUMENTS

| | | |
|---|---|---|
| JP | 61115290 A | 6/1986 |
| JP | 61115291 A | 6/1986 |
| JP | 61292289 A | 12/1986 |
| JP | 62071078 A | 4/1987 |
| JP | 62175986 A | 8/1987 |
| JP | 62175988 A | 8/1987 |
| JP | 62279591 A | 12/1987 |
| JP | 05062446 A | 3/1993 |
| JP | 08161881 A | 6/1996 |
| JP | 2001307458 A | 11/2001 |

* cited by examiner

TWO-STAGE SEALING OF A DATA STORAGE ASSEMBLY HOUSING TO RETAIN A LOW DENSITY ATMOSPHERE

RELATED APPLICATIONS

This application is a divisional of U.S. patent application Ser. No. 10/185,797 filed Jun. 27, 2002, now U.S. Pat. No. 7,218,473, and claims priority of U.S. provisional application Ser. No. 60/366,972, filed Mar. 22, 2002, entitled Method and Apparatus for Testing and Sealing a Helium Filled Disk Drive.

BACKGROUND OF THE INVENTION

A disc drive typically includes a base deck to which various components of the disc drive are mounted. A top cover cooperates with the base to form a housing that defines an internal, sealed environment for the disc drive. The components include a spindle motor, which rotates one or more discs at a constant high speed. Information is written to and read from tracks on the discs through the use of an actuator assembly. The actuator assembly includes actuator arms, which extend towards the discs, with one or more suspensions or flexures extending from each of the actuator arms. Mounted at the distal end of each of the flexures is a read/write head, which includes an air bearing slider enabling the head to fly in close proximity above the corresponding surface of the associated disc.

Disc drives are constructed in a clean room environment to prevent contaminants from entering the drive prior to the final assembly of the drive. Thus, the atmosphere within the assembled disc drive is typically that of the clean room, i.e., the filtered room air that is trapped within the drive once the cover is sealed to the base. While the seal between the base and the cover is sufficient to keep contaminants from entering the drive, it is possible for air and other gases to seep past (or permeate through) the seal and either enter or exit the drive. However, such small gas leaks are not an issue since most drives include a filtered port to equalize the air pressure within the drive to that of the ambient air pressure in order to prevent large stresses from being applied to the drive (such as during air shipment of the disc drive where the ambient air pressure is relatively low).

While air filled disc drives are currently prevalent, it is known that filling disc drives with low-density gases other than air (i.e., a gas such as helium having a lower density than air at similar pressures) can enhance drive performance. For example, helium (or another low density gas) can reduce the aerodynamic drag experienced by the spinning discs within the drive, thereby reducing the power requirements for the spindle motor. A helium filled drive thus uses substantially less power than a comparable disc drive that operates in an air environment. Additionally, the reduction in drag forces within the helium filled drive also reduces the amount of aerodynamic turbulence that is experienced by the drive components such as the actuator arms, the suspensions and the heads. These reductions in spindle motor power and "air" turbulence allow drives filled with low density gases to be operated at higher speeds than conventional air filled drives while maintaining the same tolerances (e.g., the same percentage of read/write errors). Additionally, helium filled drives may allow for higher storage capacities (i.e., higher recording densities) due to the fact that there is less turbulence within the drive and the heads may fly more closely to the disc surface.

Despite the advantages of helium filled drives, such drives have not been commercially successful. This is mainly due to problems associated with the helium (or other low density gas) leaking from the drives over time. Unlike air filled disc drives, helium filled drives do not include a filtered port to equalize the pressure within the drive to the ambient pressure. However, while prior art helium drives are completely sealed, it is still possible for the helium gas to leak out past the conventional rubber gasket seals used to seal the top cover to the drive base. Such leakage is not surprising given the relatively smaller size (lower atomic weight) of the helium atoms in comparison to the constituent gases found in air (i.e., nitrogen and oxygen). That is, the rubber gasket seals on prior art drives allow the relatively smaller helium atoms to diffuse through the rubber membrane. Indeed, such prior art gaskets do not provide hermetic seals with respect to air (i.e., the gaskets are also permeable to the larger atoms of nitrogen and oxygen in air) since it is air that typically displaces the helium gas that leaks from the drive.

As noted above, the prior art gasket seals are only intended to keep relatively large contaminants such as dust or smoke from the interior of the drive. Such gasket seals are preferred to other, more permanent methods of sealing a drive for two main reasons. First, the seals do not outgas and thus do not contribute to the contamination of the interior of the drive. Secondly, the seals may be reused if necessary during the assembly of the disc drive, such as when an assembled drive fails to pass certification testing and must be "reworked." Reworking a drive typically entails removing the top cover from the base and replacing a defective disc or read/write head while the drive is still in the clean room environment. The reworked drive is then reassembled using the same rubber gasket positioned between the base and the top cover. Unfortunately, while such gasket seals are convenient, they simply do not provide a sufficient hermetic seal to maintain the required concentration of helium (or other low density gas) within the disc drive over the service life of the drive.

As helium leaks out of a disc drive and is replaced by air, the drive is subjected to undesirable operational effects possibly leading to failure of the drive. For example, the increased concentration of air may increase the turbulent forces on the drive heads due to the increased drag forces within the drive, and may further cause the heads to fly at too great a distance above the discs, thereby increasing the instances of read/write errors. The risk of unexpected failure due to inadequate amounts of helium is a considerable drawback to helium filled disc drives, particularly since the data stored within the disc drive can be irretrievably lost if the disc drive fails.

Accordingly there is a need for an improved disc drive that can effectively prevent helium (or another low density gas) from leaking out of the drive once the drive is finally assembled. The present invention provides a solution to this and other problems, and offers other advantages over the prior art.

SUMMARY

In accordance with various embodiments, a data storage device comprises a sealed substantially planar first housing plate with respective length, width and thickness dimensions and a circumferentially extending first peripheral edge, a substantially planar second housing plate with a circumferentially extending second peripheral edge, and a circumferentially extending first sealing member contactingly disposed between the respective first and second peripheral edges.

A substantially planar third housing plate extends adjacent the first planar housing plate with respective length and width dimensions substantially corresponding to the length and width dimensions of the first housing plate, and a circumferentially extending third peripheral edge. A circumferentially extending second seal member is contactingly disposed between the second and third peripheral edges to form a hermetic seal for the low density gas.

DETAILED DESCRIPTION

Figure 1:
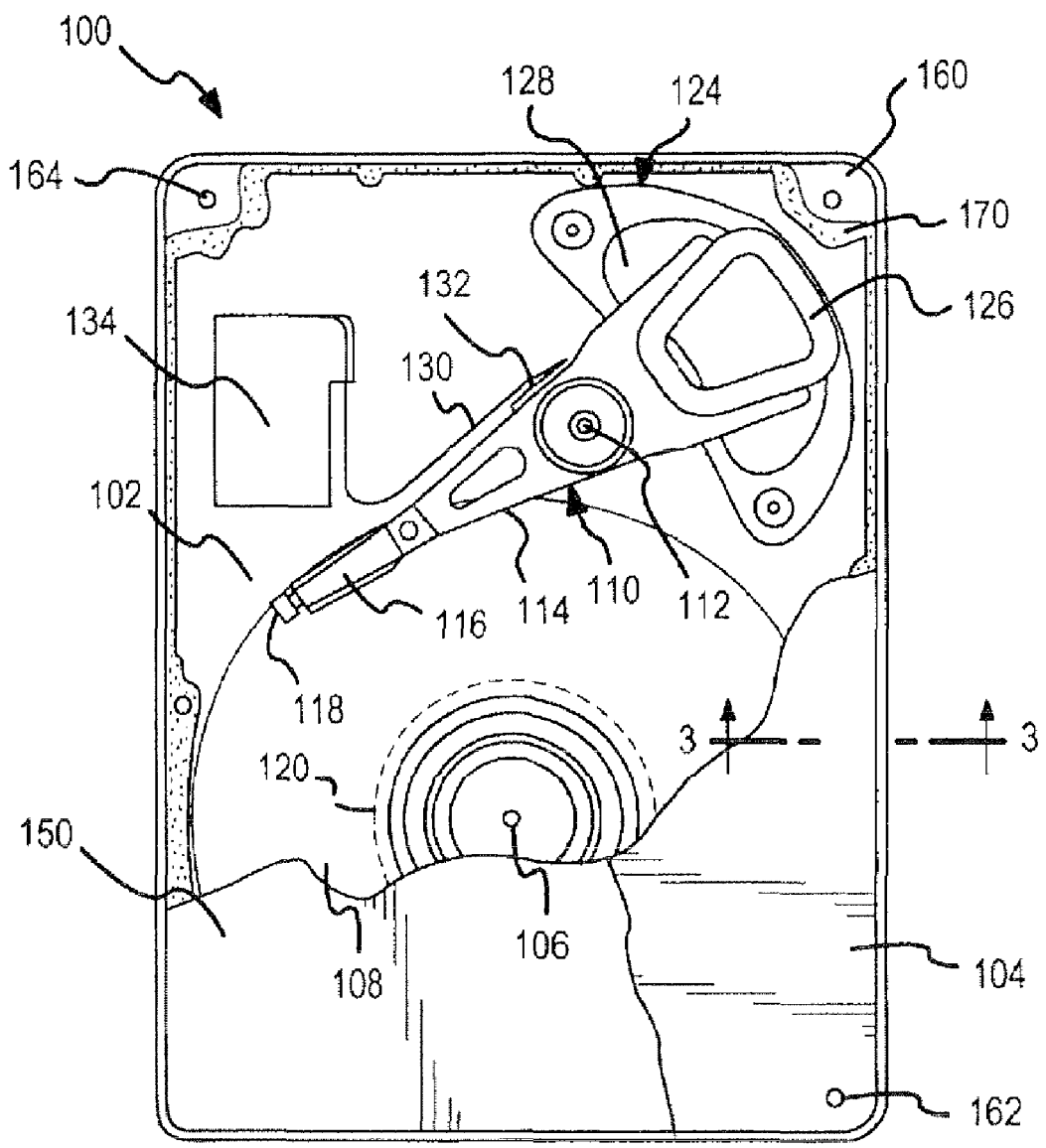
FIG. 1 is a plan view of a disc drive incorporating a preferred embodiment of the present invention including a dual cover system for sealing the disc drive, and showing the primary internal components of the disc drive.

A disc drive 100 constructed in accordance with a preferred embodiment of the present invention is shown in FIG. 1. The disc drive 100 includes a base 102 to which various components of the disc drive 100 are mounted. A structural cover 104, shown partially cut away, cooperates with the base 102 to form a housing that defines an internal environment for the disc drive in a conventional manner. The drive components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes a slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over a park zone 120 near the inner diameter of the discs 108 when the drive motor is de-energized. The heads 118 are secured over the part zone 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) reconnected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board 136 (FIG. 2) mounted to the bottom side of the disc drive 100.

Figure 2:
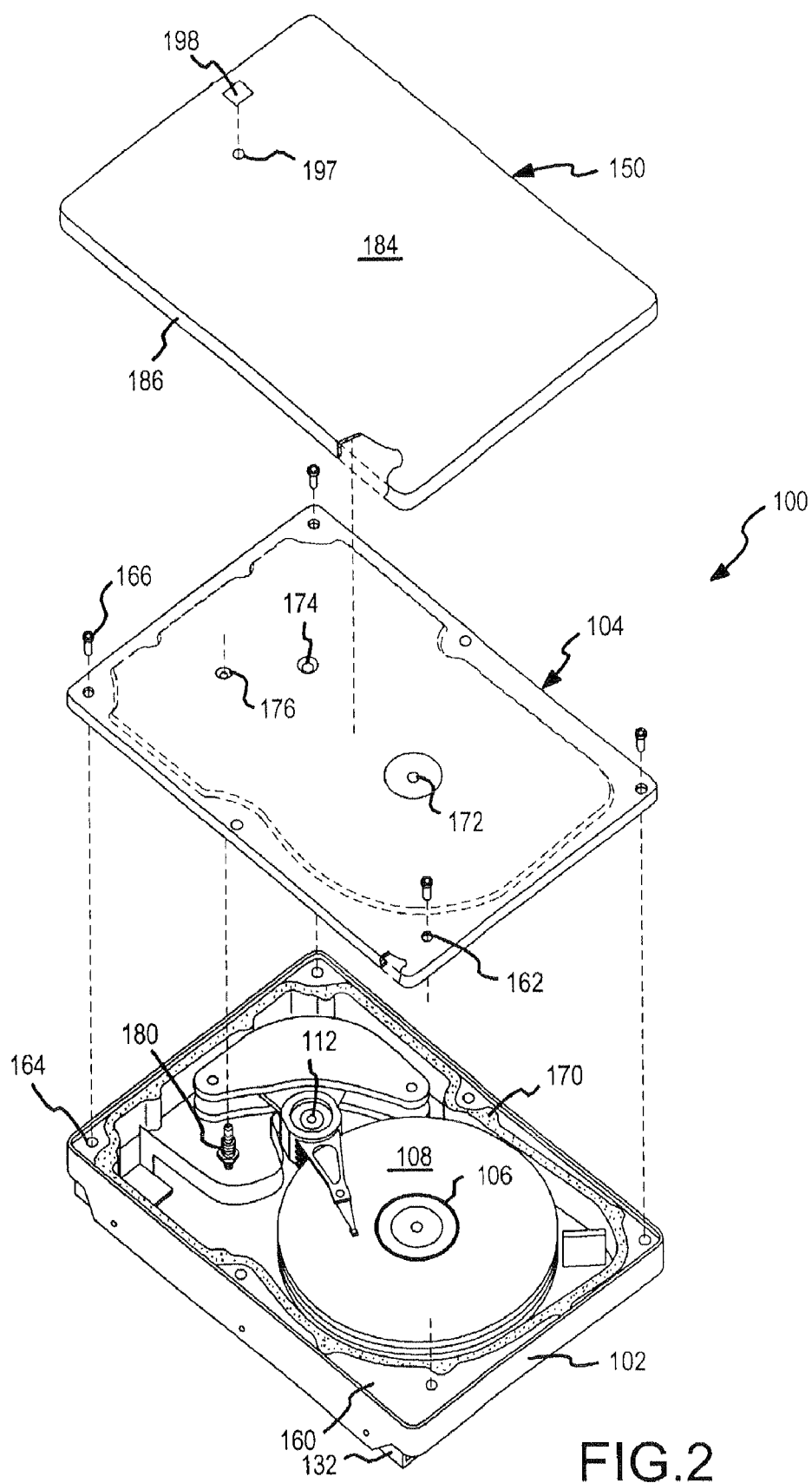
FIG. 2 is an exploded view of the disc drive shown in FIG. 1 illustrating a first embodiment of the dual cover system of the present invention and further illustrating a fill port for filling the drive with a low density gas.
Figure 3:
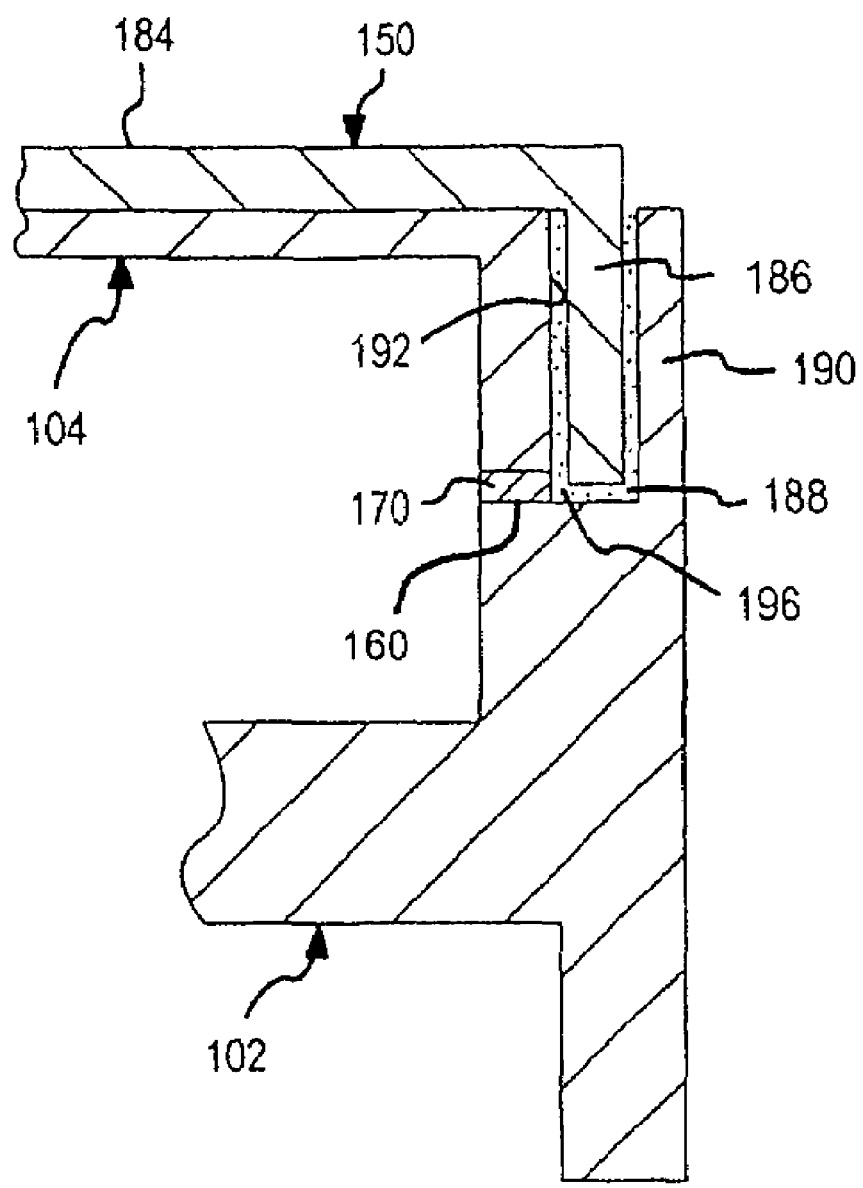
FIG. 3 is an enlarged section view taken substantially along the line 3-3 in FIG. 1.

FIGS. 1 and 2 further illustrate a second, sealing cover 150 secured over top of the first structural cover 104. The use of the second sealing cover 150 in combination with the structural cover 104 provides the requisite degree of sealing necessary to prevent the helium within the drive 100 from leaking out during the service lifetime of the drive. While FIGS. 1-3 show a first embodiment 150 of the sealing cover, alternative embodiments are described in FIGS. 4-8. Additionally, FIG. 9 describes a preferred method for assembling and testing the drive 100 utilizing the dual cover system.

FIG. 2 is an exploded view of the disc drive 100 and the two covers 104 and 150. It is noted that the base 102 includes a raised contact surface or shoulder 160 (best shown in the cross section of FIG. 3) that extends around a perimeter of the base deck 102 to provide a mating surface for a perimeter of the structural cover 104. The cover 104 is preferably sculpted to match the shape of the contact surface 160, while screw holes 162 in the cover 104 match corresponding holes 164 in the raised shoulder 160 so that a plurality of screws 166 can be used to secure the cover 104 to the shoulder 160.

Prior to screwing the cover 104 to the base deck 102, a seal 170 is preferably placed on one of the raised shoulder 160 of the base 102 or the underside perimeter of the cover 104. In the preferred embodiment shown in FIG. 2, a continuous rubber gasket seal 170 is positioned around the perimeter of the raised shoulder 160 so that the seal 170 engages the bottom surface of the cover 104 to seal the internal environment of the disc drive 100 against contaminants. The seal 170 is preferably arranged so that the screw holes 164 are positioned outside the perimeter of the seal 170 to prevent gas or contaminant leakage past the threaded screws 166.

FIG. 2 further illustrates that the structural cover 104 preferably provides structural support for the spindle motor 106 and the bearing shaft assembly 112 of the disc drive 100. Specifically, the cover 104 includes a countersunk openings 172 and 174 that correspond to the spindle motor 106 and the bearing shaft assembly 112, respectively. The importance of countersinking the holes 172 and 174 (in order to maintain a substantially flat top surface of the cover 104) is described below. However, the inclusion of the holes 172 and 174 allows the structural cover 104 to stabilize the spindle motor 106 and the actuator assembly 110 in a known manner. Additionally, the screws (not shown) holding the spindle motor 106 and the bearing shaft assembly 112 to the cover 104 include a pre-attached o-ring to provide a substantially gas tight seal with the corresponding holes 172 and 174 of the structural cover 104.

FIG. 2 also illustrates one preferred location for a fill port 176 within the structural cover 140. The fill port 176 retains one end of a gas valve 180, such as a conventional Schrader valve, while the opposite end of the valve 180 extends into the internal environment of the disc drive 100. Because the valve 180 extends downward from the cover 104, the fill port 176 is preferably located over a portion of the base deck 102 that does not contain either the discs 108 or the actuator assembly 110. As noted below, the fill port 176 need not be located in the cover 104 provided that the fill port 176 is located in a position that can be hermetically sealed. The fill port 176 is also preferably countersunk within the cover 104 so that a chuck (not shown) can mate with the valve 180 to fill the internal environment of the drive 100 with the helium. That is, once the cover 104 has been secured to the base deck 102 with the screws 166, and once additional screws (not shown) have been secured to the spindle motor 106 and the bearing shaft assembly 112 through the holes 172 and 174, respectively, a source of helium (or another low density gas) is preferably connected to the valve 180 to fill the interior of the drive with the gas. The gas supply system preferably provides a method of evacuating the drive before filling the drive with helium gas.

As described in greater detail below with respect to FIG. 9, the helium (or other low density) gas is preferably supplied until a concentration of greater than 99 percent helium is attained and the pressure of the gas within the drive is approximately one atmosphere (at sea level). Once filled with the low density gas, the disc drive 100 is subjected to a certification process that typically lasts 24 hours or less. This process is designed to simulate real-world disc drive activity at actual operating temperatures. For example, the certification process may include conducting numerous random seek operations at an elevated temperature (simulating temperatures found within a computer), followed by numerous read/write operations. If a number of read/write errors detected during the certification process exceeds a predetermined maximum number, or if testing confirms that a particular head 118 or disc 108 is defective, then the drive 100 is typically "reworked" in an effort to correct the errors.

Reworking a drive entails removing the structural cover 104 from the base deck 102 and then repairing or replacing the defective component. Once repairs are complete, the cover 104 is repositioned on the raised shoulder 160 to engage the seal 170, and the screws 166 are replaced to re-seal the drive 100. The seal 170 is preferably formed from a rubber polymer which can be reused after a rework procedure. However, if the seal 170 is damaged as the drive 100 is reworked, the seal 170 may be replaced with a new seal. Additionally, the seal 170 preferably does not contribute any outgassed components to the interior of the drive 100 either during the rework process or after the cover 104 is secured to the base 102. This is in contrast to prior art tape seals where the adhesive coating would likely outgas compounds within the drive interior. Furthermore, tape seals must often be cut to open the drive if rework of the drive is required following certification testing. Cutting a tape seal in this manner increases the danger that small pieces of the seal may contaminate the drive interior during the rework process. Additionally, a new tape seal would be required to seal the drive 100 once the drive had been successfully reworked.

Thus, the gasket seal 170 represents an improvement over prior tape seals in that the gasket seal 170 is "clean" and can be reused if the drive must be reworked (is it estimated that 5-20 percent of drives on a typical manufacturing line must be reworked to some extent). Furthermore, it is preferred that the seal 170 be relatively impervious to the passage of helium (or other low density gas) there through, at least with respect to the short time period (e.g., 24 hours) required to conduct certification testing on the drive. That is, the seal 170 should be sufficiently impervious to helium so that there will be only an insignificant amount of leakage during the approximate one day certification testing period. A preferred gasket seal is manufactured by the Dyneon Corp. of North Oakdale Minn. and has a leak rate of less than $1\times10^{-6}$ cubic centimeters per second ("cc/sec") for a disc drive having an internal volume of approximately 100 cubic centimeters. Indeed, the seal 170 preferably has a leak rate of less than $1\times10^{-7}$ cc/sec of helium in one preferred embodiment. Similarly, investigation has shown that the Schrader valve 180 used to fill the drive with helium typically has a leak rate of approximately $1\times10^{-8}$ cc/sec of helium, or approximately one to two orders of magnitude less than the seal 170.

Thus, although the seal 170 represents the largest potential source for leakage of helium from the drive 100, the small amount of leakage described above will not reduce the concentration or pressure of the helium gas to any appreciable extent over the course of a 24 hour testing period. However, the leak rate from the seal 170 is sufficient to impact the operation of the drive 100 if the leak is allowed to continue past the testing phase. For example, assuming the seal 170 leaks helium at a rate of $1\times10^{-7}$ cc/sec, it would take approximately 115 days for a single cubic centimeter of helium to leak from the drive 100. Thus, if the concentration of the helium within the drive must remain above 99 percent, and assuming the concentration was 100 percent immediately after the drive was filled, the drive 100 would be operating outside of specifications within four months if the drive relied only on the seal 170.

While it is possible to provide internal helium reservoirs or other systems for periodically refilling the drive 100 with helium, a better solution to the problem of leaking seals is to provide a true hermetic seal that prevents any appreciable leakage of helium from the drive 100. The present invention provides such a hermetic seal through the use of a second sealing cover 150 as described above. FIGS. 2 and 3 illustrate one embodiment 150 of the sealing cover that is installed on the drive 100 once the drive has passed certification testing. FIG. 2 illustrates that the embodiment 150 of the sealing cover is a thin-walled metal cover having a flat top surface 184 and downward depending sides 186. The cover 150 may be formed from aluminum or brass, provided that it is substantially impervious to helium or other low density gases.

In the preferred embodiment shown in FIG. 3, the cover 150 is attached to the drive 150 within a gap or groove 188 formed between a raised outer edge 190 of the base 102 and an outer surface 192 of the structural cover 104. That is, the cover 104 is supported on the raised shoulder 160 of the base deck 102 so that the seal 170 is compressed between a lower surface of the cover 104 and the raised shoulder 160. The cover 104 is preferably sized to form the gap or groove 188 that runs along the entire perimeter of the cover 104 between the outer surface 192 of the cover and the raised outer edge 190 of the base deck. A liquid adhesive 196 is then preferably injected to a predetermined depth within the groove 188 to allow for the later insertion of the sides 186 of the cover 150. Once the groove 188 is filled all the way around with the adhesive 196, the sealing cover 150 is applied over the top of the structural cover 104 so that the downward depending sides 186 of the cover extend into the adhesive-filled groove 188, as shown in FIG. 3. The adhesive 196 surrounds the sides 186 of the sealing cover 150 and cures quickly to form a hermetic seal about the perimeter of the structural cover 104. Indeed, as shown in FIG. 3, the adhesive 196 abuts the rubber seal 170 and thereby prevents any leakage of the helium gas through the rubber seal 170.

In one preferred embodiment the adhesive is an epoxy mixture such as that manufactured by Loctite Corp. of Rocky Hill, Conn., under the name Hysol® E-20NS. This medium-viscosity epoxy cures at room temperature in a relatively short time (about 20 minutes) and thus can be used without any special heating or cooling equipment. In a preferred embodiment, the application of the epoxy adhesive 196 within the groove 188 is performed by an automated machine (not shown) that produces a uniform bead of adhesive to prevent any spillage (excess) or any gaps in coverage within the groove 188.

An underside of the sealing cover 150 preferably includes a pressure sensitive adhesive ("PSA") so that the cover 150 seals tightly against the sop surface of the structural cover 104. As discussed above, the structural cover 104 preferably presents a substantially flat top surface, and any openings in the top cover (such as the screw holes 162 and the openings 172, 174 and 176) are preferably countersunk so that the screw heads do not extend above the top surface of the cover 104. In this manner, the bottom surface of the sealing cover 150 may sit flush against the top surface of the structural cover 104 (FIG. 3), and the PSA applied to the sealing cover 150 will help to keep the cover 150 in place while the adhesive 196 cures within the groove 188. Alternatively, a similar epoxy adhesive could be applied to one of the top surface of the structural cover 104 or the bottom surface of the sealing cover 150 in place of the PSA.

Additionally, in order to allow air to escape as the sealing cover 150 is placed over top of the structural cover 104, an air hole 197 may optionally be formed in the sealing cover as shown in FIG. 2. The air hole 197 allows any air trapped between the two covers 104 and 150 to escape as the cover 150 is applied, thereby preventing air bubbles from being trapped between the covers. Of course, the air hole 197 must itself be sealed to maintain the overall hermetic seal of the drive 100, and thus a metallic patch seal 198 is preferably applied over top of the air hole 197. The patch seal 198 is preferably formed from the same material as the cover 150 itself and the same epoxy adhesive may be used to secure the patch seal 198 over the hole 197. Alternatively, the seal 198 may be coated with a PSA or an adhesive sticker may be used as the patch seal 198.

As noted above, the sealing cover 150 may be formed from a number of materials that are impervious to helium, although it is preferred to use an aluminum or a brass material having a thickness of approximately 0.010 inches. In this manner, the cover 150 will only add approximately ten thousandths of an inch to the overall height of the drive 100, which additional height will not likely impact the ability of the given drive to meet the required form factor dimensions.

Thus, the sealing cover 150 works in conjunction with the structural cover 104 to provide a hermetic seal only after the drive 100 has passed certification testing. In this manner, the more traditional rubber seal 170 of the structural cover 104 will hold the helium gas within the drive for a short period of time (i.e., will allow an insignificant amount of helium gas leakage) while allowing for a relatively simple rework process if the drive 100 does not pass certification testing. That is, by waiting until the drive has been certified before adding the more permanent sealing cover 150, manufacturers will not be forced to break the hermetic seal to rework a disc drive. Furthermore, by providing both a structural cover 104 and a sealing cover 150, the drive can be fully tested prior to the application of the sealing cover 150 since the cover 150 is not necessary for proper operation of the drive 100. Additionally, by waiting until the structural cover 104 and the rubber seal 170 are in place before applying the adhesive 196, there is no concern that the adhesive may outgas or otherwise contaminate the interior of the drive 100 since the inner seal 170 will prevent such contamination. Thus, the use of a "dirty" sealant (such as the epoxy adhesive 196) is possible with the present invention, while prior art (single cover) drives would not be able to use such "dirty" seals due to outgassing concerns. Furthermore, the sealing cover 150 not only prevents leakage through the rubber seal 170 but also prevents leakage through the other openings formed in the structural cover 104, and particularly through the fill port 176 for the valve 180.

Thus, the cover 150 creates a hermetic seal that will maintain desired concentrations of helium (or other low density gases) within the drive 100 over the operational lifespan of the drive. For instance, experiments have shown that disc drives constructed as described above will leak helium as such law rate that it would take over 70 years for the helium concentration to drop below a predetermined lower limit.

Figure 4:
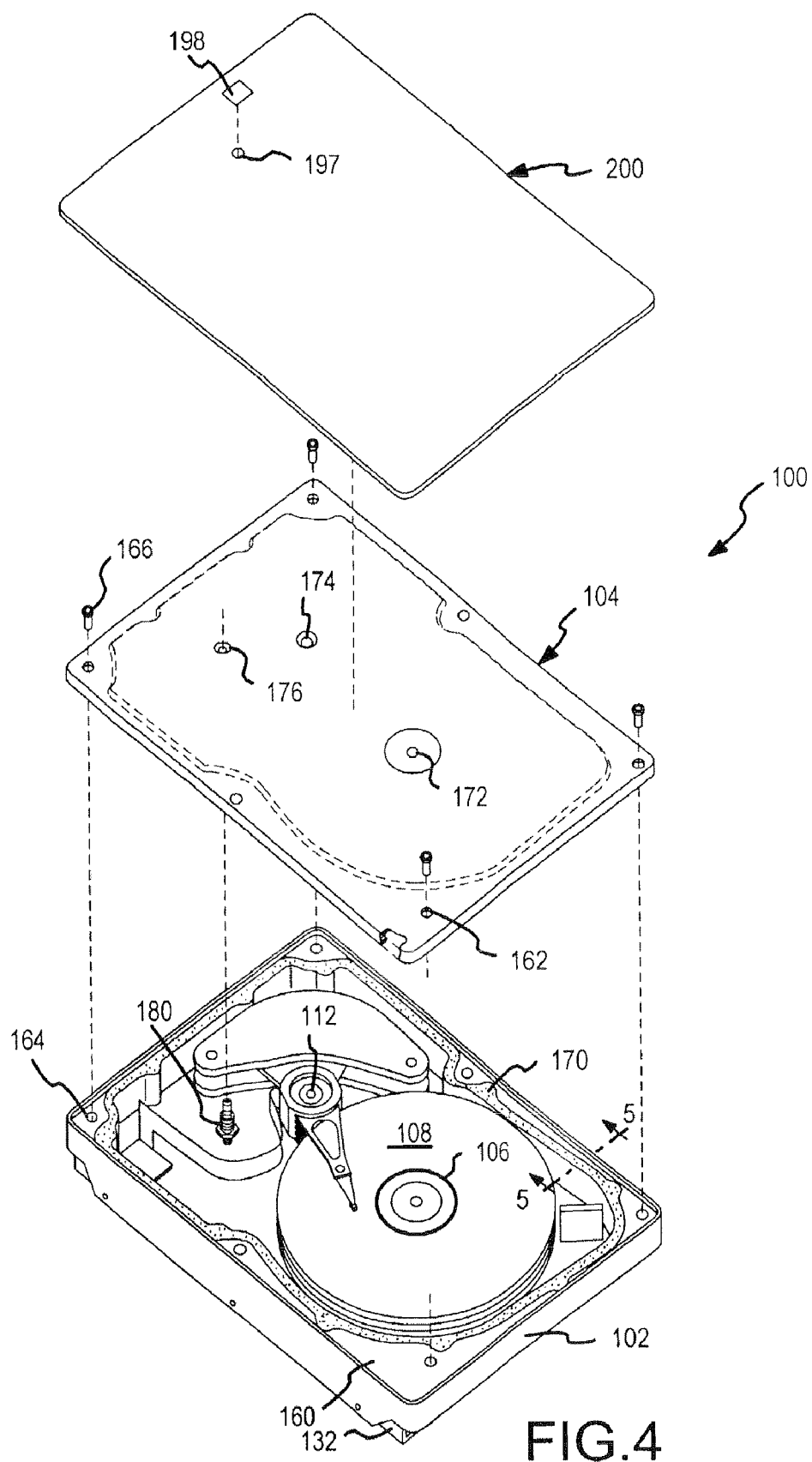
FIG. 4 is an exploded view similar to FIG. 2 illustrating a second embodiment of the dual cover system of the present invention.
Figure 5:
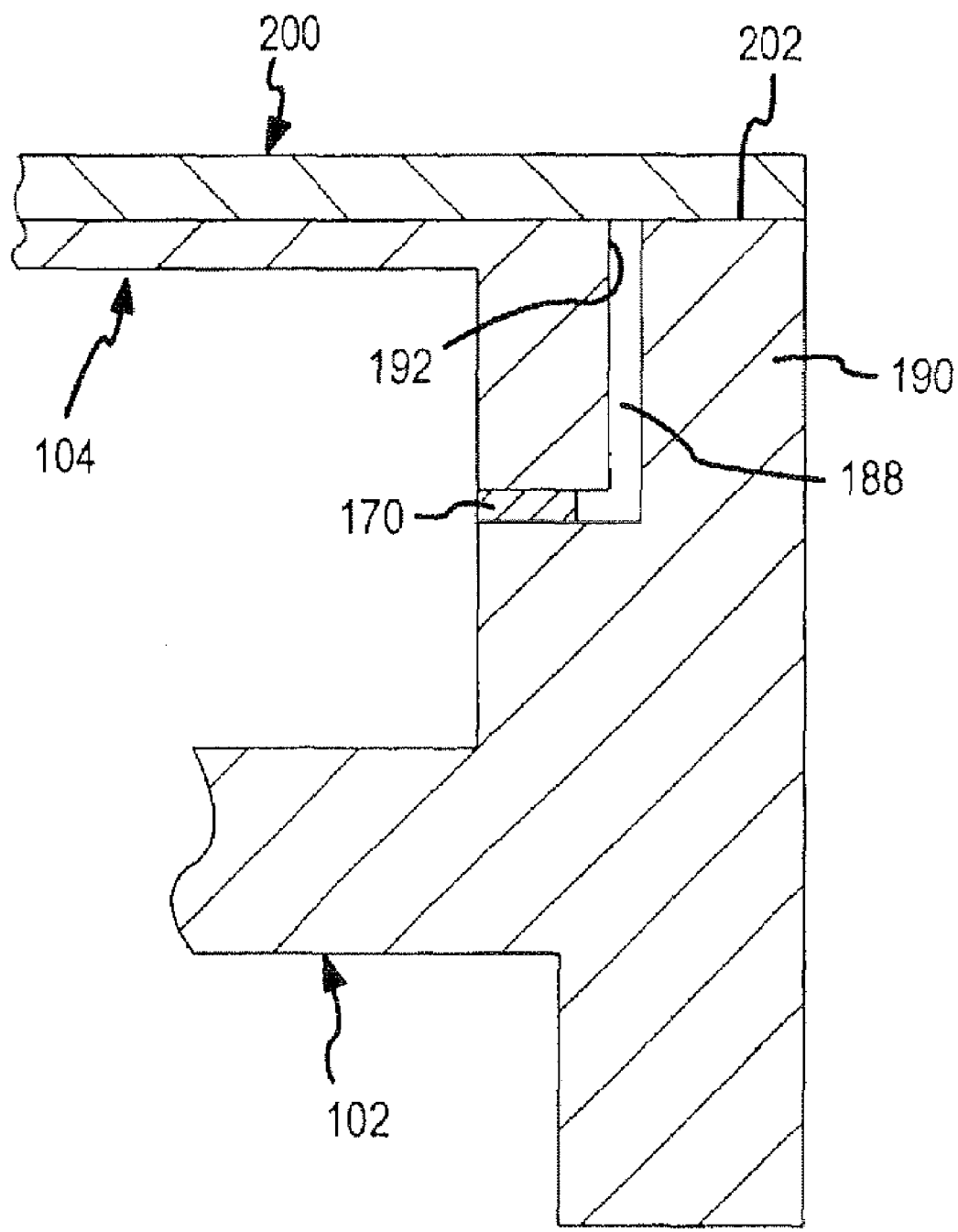
FIG. 5 is an enlarged section view taken substantially along the line 5-5 in FIG. 4.

A second embodiment 200 of the sealing cover is shown in FIGS. 4 and 5, where the parts are referred to with the same reference numerals used above. Specifically, the drive 100 includes substantially the same base deck 102 and structural cover 104, as well as the same rubber seal 170 extending around the perimeter of the base deck 102. Furthermore, the perimeter of the base deck 102 includes a raised outer edge 190 that extends upward to the same level as the top surface of the structural cover 104, as shown in FIG. 5. Thus, when the cover 104 is assembled to the base 102 as described above, a similar gap 188 is preferably maintained between the outer surface 192 of the cover 104 and the upper edge 190 of the base deck 102. However, due to the specific design of the alternative sealing cover 200, the gap or groove 188 need not be as large as that shown in FIG. 3 with respect to the first embodiment 150 of the sealing cover. This is because the sealing cover 200 shown in FIGS. 4 and 5 does not include an edge that sits within the gap 188 but rather comprises a substantially flat sheet that is soldered to a top surface 202 of the raised outer edge 190 of the base 102.

Specifically, the cover 200 is preferably formed from a piece of tin-plated brass having a thickness of approximately 0.010 inches. While it is possible to plate only the edges of the brass cover (as only these edges will be soldered), it is more economically viable to stamp the cover 200 from a role or sheet of pretinned brass. Of course, one skilled in the art may substitute alternative metals for the brass sheet provided that the metals may be soldered to the base plate 102. Additionally, in order to enhance the solder connection to the base plate 102, the entire aluminum base deck 102 is preferably provided with an electroless nickel coat.

The preferred method for attaching the cover 200 to the top surface 202 of the edge 190 of the base deck is to pre-coat the top surface 202 with a solder paste (a tin-bismuth paste is preferred) and then place the cover 200 on top of the cover 104 as shown in FIGS. 4 and 5. As described above, the bottom surface of the cover 200 preferably includes a PSA which engages the top surface of the substantially flat structural cover 104 to maintain the sealing cover 200 in place during the soldering process. A hot shoe (not shown) is then run along the seam between the cover 200 and the raised outer edge 190 of the base deck to melt the solder paste and form the solder joint. The hot shoe preferably has sufficient thermal mass (i.e., a starting temperature of approximately 600 degrees Fahrenheit) to quickly raise the temperature of the joint above the melt point for the solder (approximately 280 degrees Fahrenheit). In this manner, the joint is formed quickly (i.e., the heat is applied for a relatively short period of time) so that the overall temperature of the base deck 102 is not appreciably raised. A short solder time is important to prevent the electronic circuitry within the drive 100 (and on the printed circuit board 132) from being damaged by the elevated temperatures. The ability to quickly form the solder joint (i.e., the ability to quickly raise the temperature of the joint) is aided by the fact that the raised outer edge 190 of the base deck 102 is preferably thin (approximately 0.05 inches) so that the top surface 202 of the edge 190 may be quickly heated. Indeed, experiments have shown that the joint temperature is raised to approximately 450 degrees Fahrenheit in approximately 0.5 seconds. Additionally, the relatively thin outer edge 190 helps to limit thermal conductivity from the edge 190 into the remainder of the base deck. This fact, plus the small air gap 188 between the outer edge 190 and the structural cover 104, helps to insulate the solder joint from the other components of the disc drive 100.

Thus, the alternative sealing cover 200 functions like the cover 150 shown in FIGS. 2 and 3 to form a hermetic seal by sandwiching the structural cover 104 and the rubber seal 170 between the base deck 102 and the sealing cover 200. As described above, the cover 200 preferably includes a air hole 197 and a separate small cover 198 to seal the air hole. Furthermore, while specifically preferred materials have been described above for the cover 200, the base plate coating and the solder paste, it is understood that those skilled in the art may substitute alternative materials for one or all of these components. The present invention is considered to cover all such substitute components provided that the drive includes a second cover 200 sealed over top the first cover 104 to prevent helium gas from leaking through the first cover or the seal 170 between the first cover 104 and the base deck 102.

While the adhesive embodiment shown in FIGS. 2-3 is presently preferred by the inventors, the choice between the two embodiments of the sealing cover 150 and 200 may turn on whether there is a preference for soldering or using an epoxy adhesive on the drive assembly line. In either case, it is possible to apply the final cover (either 150 or 200) outside of the clean room environment since the drive 100 is sufficiently well sealed by the rubber seal 170 to prevent contaminants from entering the drive.

Figure 6:
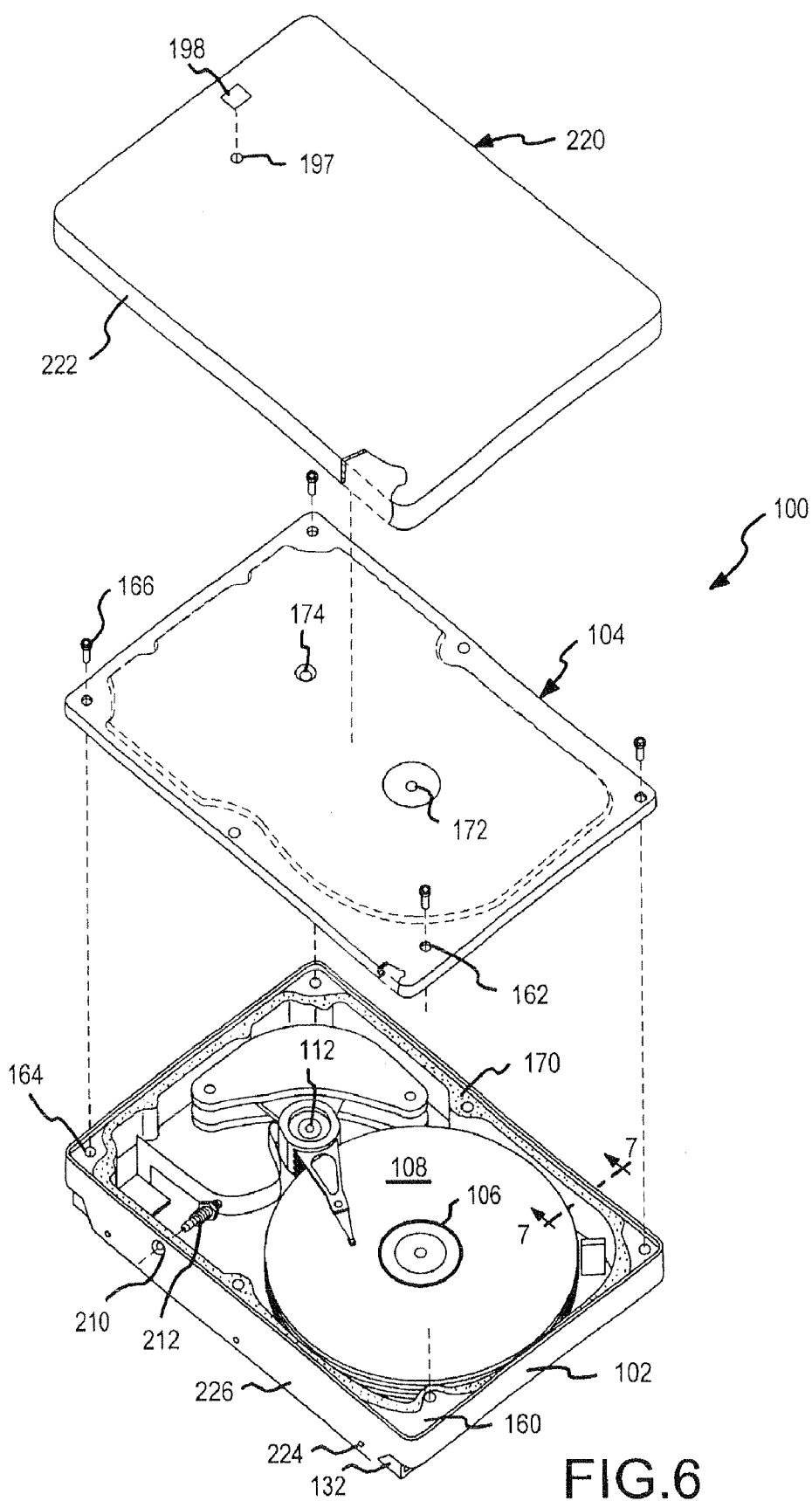
FIG. 6 is an exploded view similar to FIGS. 2 and 4 illustrating a third embodiment of the dual cover system of the present invention and further illustrating a side-mounted fill port for filling the drive with a low density gas.
Figure 7:
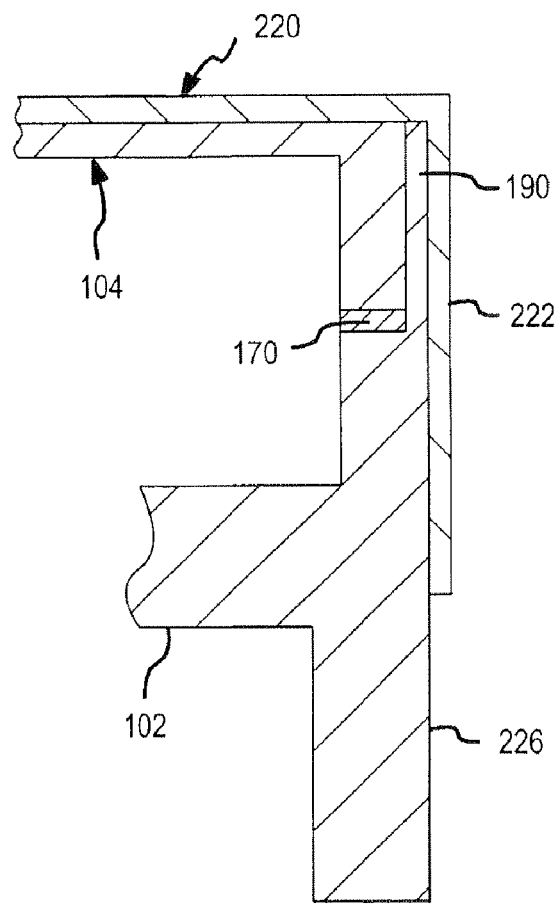
FIG. 7 is an enlarged section view taken substantially along the line 7-7 in FIG. 6.
Figure 8:
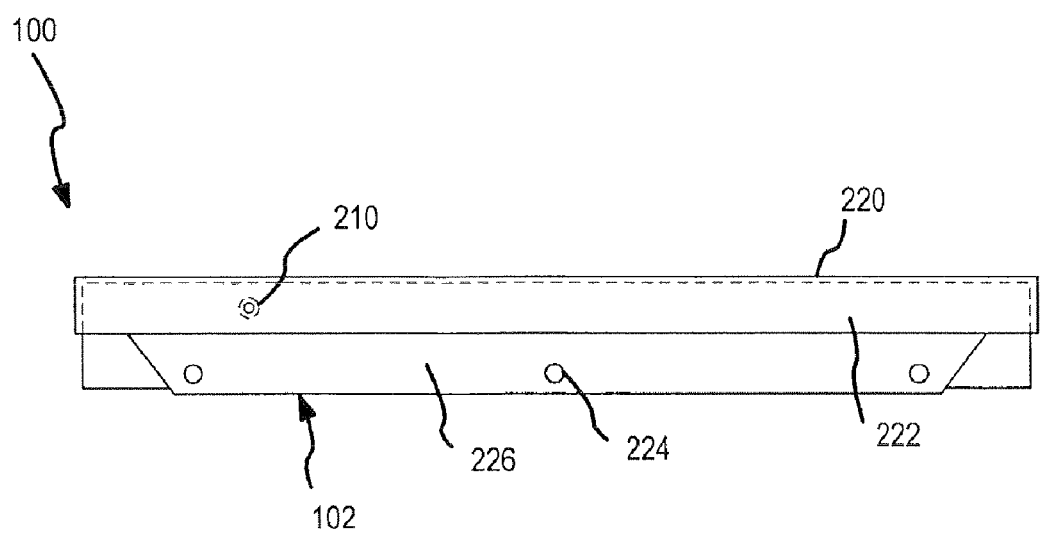
FIG. 8 is an elevated side view of the disc drive shown in FIG. 6 illustrating an outer cover of the dual cover system sealing the side-mounted fill port.

Both of the embodiments of the present invention shown in FIGS. 1-5 disclose a fill port 176 positioned in the structural cover 104 so that the valve 180 extends downward into the interior volume of the drive. However, an alternative fill port 210 (FIGS. 6-8) may be formed on one of the sides or ends of the disc drive 100 so that a Schrader valve 212 extends laterally as opposed to vertically into the interior of the drive, as shown in FIG. 6. In such an embodiment, an alternative embodiment 220 of the sealing cover preferably includes downwardly depending sides 222 that extend outside of the outer edge 190 of the base deck. In this manner, the sides 222 may extend down beyond the position of the fill port 210 to hermetically seal the fill port, as shown in FIG. 8.

A further reason to utilize the alternative sealing cover 220 may be that there is simply insufficient room within the interior of the drive 100 to accommodate the sealing covers 150 and 200. That is, the cover 150 requires a groove 188 that is sufficiently wide to hold the downward depending edges 186 of the cover on either side of the discs 108, while the alternative cover 200 requires a sufficiently wide top surface 202 of the outer edge 190 to provide a base for the solder joint. Thus, in both of these cases, the discs 108 must be of a sufficiently small diameter to provide the necessary clearance on either side of the discs (given the fixed form factor of the drive 100) to accommodate the sealing covers 150 and 200. This is typically not a problem with high performance drives (which will most likely benefit from the performance increase of a helium environment) since these drives typically utilize smaller, faster rotating discs than those found in more mass market-oriented drives. For example, within a 3.5 inch form factor drive, the diameter of discs 108 that are typically found in a high performance drive rotating at 10,000 revolutions per minute ("RPM") or higher is approximately 84 millimeters, while the diameter of discs 108 found in drives with a rotational speed of 5,400 or 7,200 RPM is approximately 95 millimeters. Thus, the larger diameter of the slower-speed discs may require too much room within the drive interior to accommodate either of the covers 150 or 200 described above.

Therefore, in those cases where an opening on one of the sides or ends of the drive needs to be hermetically sealed (such as the fill port 210), or where there is insufficient room to accommodate the covers shown in FIGS. 1-5, the alternative sealing cover 220 is preferably used. As with the covers 150 and 200, the sealing cover 200 is preferably formed from an aluminum or brass sheet having a thickness of approximately 0.010 inches. Additionally, the downward depending sides 222 of the cover 220 are preferably formed with as great a length as possible to provide maximum sealing area against the sides and ends of the base deck 102. Although it is understood that the sides 222 of the cover 220 should not be so long that they interfere with either an electrical connector at one end of the printed circuit board 132 or the mounting holes 224 formed in the side rails 226 of the base deck 102 (FIG. 8).

The preferred method for securing the sealing cover 220 to the structural cover 104 and the sides and ends of the base deck 102 is to apply an adhesive epoxy as described above to both the underside of the cover 220 and to the interior surface of the downward depending sides 222 so that a continuous seal is formed about the perimeter of the cover 220 as the cover 220 is slid into place over the cover 104 and the base deck 102. Alternatively, a PSA may be used in place of the epoxy on the bottom side of the cover 220, and/or the liquid epoxy may be applied to the sides and ends of the base plate as opposed to the interior surface of the cover 220. In either event, the tight dimensions of the cover 220 relative to the outer perimeter of the base plate ensure that the epoxy will be spread evenly as the cover 220 is lowered over top of the drive 100. Furthermore, because the thickness of the cover is preferably only about 0.010 inches, the cover 220 will only increase the width and depth dimensions of the drive by approximately 0.020 inches and will only increase the height by 0.010 inches. Thus, it is likely that the addition of the cover 220 on the outer surface of the drive 100 will not violate the form factor envelope of the drive 100.

Figure 9:
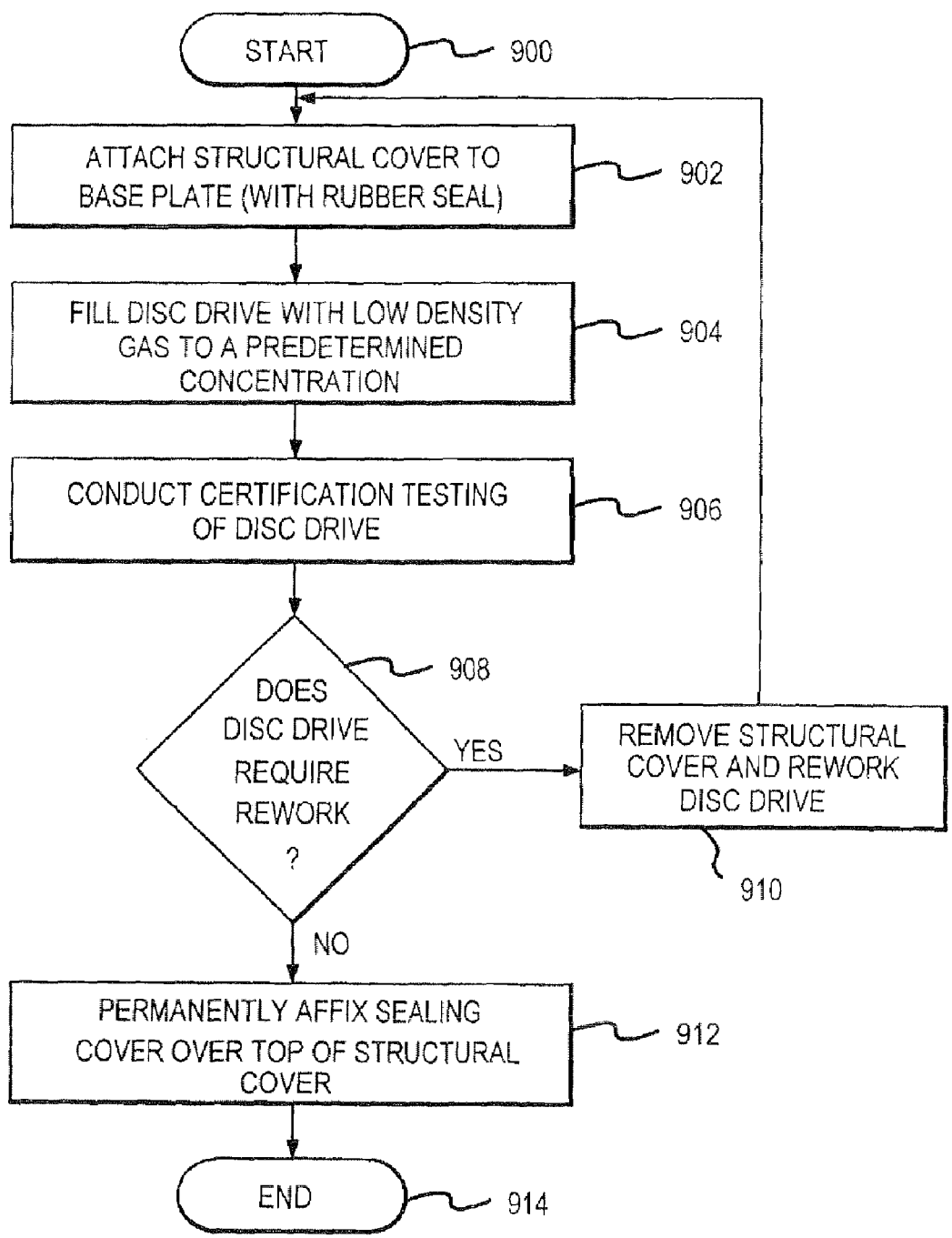
FIG. 9 is a flow chart of a general method of filling a disc drive with a low density gas and sealing the disc drive according to a preferred embodiment of the present invention.

Referring now to FIG. 9, a method of hermetically sealing a disc drive 100 that is filled with helium (or another low density gas) will be described. The method starts at 900 and a first operation 902 entails securing the structural cover 104 to the base plate 102 with the rubber seal 170. This sealing step prevents the interior of the drive from being contaminated while the attachment of the structural cover 104 allows the drive 100 to function properly for testing purposes. In operation 904, a source of helium is connected to the fill port (176 or 210) and helium is supplied to the drive (while air is first evacuated from the drive) until a predetermined helium concentration and pressure is achieved. Next, the drive 100 is tested in operation 906 to determine whether the drive meets operational specifications. This is known as certification testing.

Following step 906, a determination is made at 908 as to whether the drive 100 requires a reworking procedure to cure any defects found during certification testing. If the determination 908 is positive, the method continues to operation 910 where the structural cover 104 is removed (thereby allowing the helium gas within the drive 100 to escape) and any needed repairs are made. Once the rework procedure is completed, the method then returns to operation 902 where the structural cover 104 is again attached to the base 102. The drive 100 is then refilled with helium (step 904) and is once again tested in operation 906. If the determination 908 is negative (i.e., if the drive 100 does not require reworking), the method continues to operation 912 where the sealing cover (150, 200 or 220) is permanently affixed over top of the structural cover 104. The method then terminates at 914.

One significant advantage to the dual cover technique of the present invention is that the first cover and the associated rubber seal will leak helium at a sufficiently low rate that the drive will not require a refill of the helium (or other low density) gas after the certification testing and prior to affixing the sealing cover to the drive. Of course, such a refill option is available if a helium filled drive was forced to endure a longer than average certification process (i.e., more than a few days). Alternatively, it is possible to account for the helium gas that will leak during the certification testing by slightly overfilling the drive with helium in step 904. Thus, by initially pressurizing the drive above atmospheric pressure, any helium leakage that occurs during certification testing will not necessarily be replaced by air from outside the drive. Therefore, intentionally overfilling the drive to account for the initial leakage through the seal 170 allows manufacturers to achieve the desired concentration and pressure of the helium gas within the drive when the sealing cover (150, 200 or 220) is fixed to the drive at the end of the testing period.

A second advantage to the dual cover technique is that the two separate seals provide a measure of redundancy that will safeguard the operation of the disc drive should either seal fail. For example, if the rubber seal 170 were to fail after a number of years, the hermetic seal created by the sealing cover (150, 200 or 220) would continue to prevent any leakage of gas or contaminants into or out of the disc drive 100. Alternatively, if the hermetic seal of the second cover were to break at any point (e.g. if the solder joint were to separate), the helium gas within the drive 100 would only leak out at a very slow rate as described above. That is, the redundant rubber seal 170 between the base plate 102 and the structural cover 104 will hold a minimal quantity or concentration of the helium gas for a sufficient period of time to enable circuitry within the drive (e.g., circuitry that monitors helium concentration) to detect the leak and warn the user that drive failure is imminent. Such a warning would allow the user to back up crucial data or completely copy or image the contents of the drive to a new drive before the leaking drive experiences a failure.

Described in another way, disc drive (such as 100) in accordance with an exemplary preferred embodiment of the present invention has a rotatable disc (such as 108) carried by a spindle motor (such as 106) and an actuator assembly (such as 110) having a read/write head (such as 118) adapted to operate in a low density gas environment. The disc drive includes a base plate (such as 102) supporting the spindle motor (such as 106) and the actuator assembly (such as 110) and a structural cover (such as 104) removably attached to the base plate (such as 102) to form an internal environment within the disc drive. The internal environment of the drive is filled with a low density gas such as helium, and a sealing cover (such as 150, 200 and 220) is permanently attached to the base plate (such as 102) and the structural cover (such as 104) to form a hermetic seal that maintains a predetermined concentration of the low density gas within the internal environment over a service lifetime of the disc drive (such as 100). In one embodiment, the structural cover (such as 104) is fastened to one of the spindle motor (such as 106) and the actuator assembly (such as 110) to permit operation of the drive.

The disc drive (such as 100) further includes a first seal (such as 170) secured between the base plate (such as 102) and the structural cover (such as 104) to prevent contaminants from entering the internal environment of the disc drive. The first seal (such as 170) is formed from a material such as rubber that allows leakage of the low density gas from the internal environment at a sufficiently low rate to allow operation of the disc drive (such as 100) for a predetermined period of time in the absence of the sealing cover (such as 150, 200 and 220).

In one embodiment, the sealing cover (such as 150 and 220) is attached to the base plate (such as 102) and the structural cover (such as 104) by an adhesive (such as 196). The base plate (such as 102) includes a raised outer edge (such as 190) and the sealing cover (such as 150) includes a downward depending edge (such as 186) that is adhesively bonded within a groove (such as 188) formed between an outer surface (such as 192) of the structural cover (such as 104) and the raised outer edge (such as 190) of the base plate (such as 102). Alternatively, the sealing cover (such as 220) includes a downward depending edge (such as 222) that is adhesively secured to an outer perimeter wall of the base plate (such as 102). In an alternative embodiment the base plate (such as 102) includes a raised outer edge (such as 190) and the sealing cover (such as 200) is soldered to a top surface (such as 202) of the raised outer edge (such as 190) of the base plate.

Another embodiment of the present invention may be described as a method of hermetically sealing a disc drive (such as 100) filled with a low density gas. The method includes a step (such as 902) of removably attaching a structural cover (such as 104) to a base plate (such as 102) to define an internal environment of the disc drive. A next step (such as 904) includes filling the internal environment of the disc drive (such as 100) with the low density gas. A final step (such as 912) includes permanently attaching a sealing cover (such as 150, 200 and 220) to the base plate (such as 102) and the structural cover (such as 104) to form a hermetic seal that maintains a predetermined concentration of the low density gas within the internal environment over a service lifetime of the disc drive. In one embodiment, the method may include the steps (such as 906 and 9190) of testing the disc drive prior to permanently attaching the sealing cover (such as 150, 200 and 220) and removing the structural cover (such as 104) and reworking the disc drive (such as 100) if the testing step (such as 906) discloses a failure in the disc drive.

Yet another embodiment of the present invention may be described as a disc drive (such as 100) having a base plate (such as 102) supporting an actuator assembly (such as 110) having a read/write head (such as 118) adapted to operate in a low density gas environment. The disc drive includes a structural cover (such as 104) removably attached to the base plate (such as 102) to form an internal environment within the disc drive that is filled with a low density gas such as helium. The disc drive further includes means (such as 150, 200 and 220) for hermetically sealing the low density gas within the internal environment over a service lifetime of the disc drive (such as 100). The disc drive also includes a first seal (such as 170) secured between the structural cover (such as 104) and the base plate (such as 102), wherein the first seal (such as 170) is formed from a material that allows leakage of the low density gas from the internal environment at a sufficiently low rate to allow operation of the disc drive (such as 100) for a predetermined period of time in the absence of the means (such as 150, 200 and 220) for hermetically sealing the low density gas.

Thus, the present invention provides an improvement over prior helium filled drives which rely on traditional sealing methods (such as a rubber gasket seal between the cover and the base plate) to attempt to maintain the helium (or other low density gas) within the drive interior. This is because such prior art sealing methods are unable to provide the type of hermetic seal required to prevent the leakage of gas, particularly when the gas has a relatively small atomic weight as in the case of helium. Indeed, such prior art seals were intended to keep environmental contaminants from entering the drive as opposed to keeping gas from leaking from the drive. The present invention solves this problem by providing a system of two separate covers: a first cover (similar to prior art covers) that provides a structural support for the drive but that also may be removed if necessary to rework the drive; and a second cover that may be affixed to the drive using "dirty" sealing techniques capable of providing a hermetic seal. Such dirty sealing techniques will not impact the cleanliness of the drive interior since the second cover is affixed outside of both the first cover and the first seal so that any fumes generated by the epoxy adhesive (or any debris generated by the soldering technique) will not invade the drive interior.

It will be clear that the present invention is well adapted to attain the ends and advantages mentioned as well as those inherent therein. While embodiments have been described for purposes of this disclosure, various changes and modifications may be made which are well within the scope of the present invention. For example, the configuration of the base plate and the structural/sealing covers may be altered as desired to accommodate different drive designs and different form factors. Additionally, the materials used for the sealing cover may be altered depending on the precise sealing technique used to achieve a hermetic seal. Numerous other changes may be made which will readily suggest themselves to those skilled in the art and which are encompassed in the scope of the invention disclosed and as defined in the appended claims.

What is claimed is:

1. A data storage device comprising:
   a sealed housing which encloses a data storage medium, the sealed housing comprising a substantially planar first housing plate with respective length, width and thickness dimensions and a circumferentially extending first peripheral edge, a substantially planar second housing plate with a circumferentially extending second peripheral edge, and a circumferentially extending first sealing member contactingly disposed between the respective first and second peripheral edges;
   a substantially planer third housing plate extending adjacent the first planar housing plate with respective length and width dimensions substantially corresponding to said length and width dimensions of the first housing plate and a circumferentially extending third peripheral edge; and
   a circumferentially extending second seal member contactingly disposed between the second and third peripheral edges to form a hermetic seal for a low density gas retained within the sealed housing.

2. The device of claim 1, further comprising a layer of adhesive between respective medial portions of the first housing plate and the third housing plate to affix the third housing plate to the first housing plate.

3. The device of claim 1, wherein the first housing plate has a fill port aperture extending therethrough to facilitate placement of the low density gas into the sealed housing prior to attachment of the third housing plate to the second housing plate by way of the second sealing member, and wherein the third housing plate and the second sealing member hermetically seal the fill port aperture.

4. The device of claim 1, wherein the first sealing member is characterized as an elastomeric seal.

5. The device of claim 1, wherein the second sealing member is characterized as an epoxy.

6. The device of claim 5, wherein the epoxy is characterized as a type which generates an outgassing contaminant during curing which can interfere with operation of the storage medium, and wherein the first sealing member is formed of a material selected to restrict passage of said outgassing contaminant into the sealed housing adjacent the medium.

7. The device of claim 1, wherein the second sealing member is characterized as a solder paste which is selectively heated to melt and form the hermetic seal.

8. The device of claim 1, wherein the third housing plate comprises an aperture extending therethrough to allow air between the first and third housing plates to escape as the third housing plate is lowered onto the first housing plate, and wherein the device further comprises a third sealing member applied to the third housing plate to hermetically seal the aperture.

9. The device of claim 1, wherein the thickness of the first housing plate is characterized as a first thickness, and wherein the third housing plate has a second thickness less than the first thickness.

10. The device of claim 1, wherein a circumferentially extending groove is formed between the first and second housing plates, and wherein the third peripheral edge and the second sealing member are disposed within said groove.

11. A data storage device comprising:
    a sealed housing comprising a base plate supporting a storage medium, a structural cover removably attached to the base plate to form an internal environment within the device, and a circumferentially extending first sealing member between the respective base plate and structural cover to form an internal environment filled with a low density gas; and a substantially planar sealing cover with a medial portion attached to a medial portion of the structural cover; and a circumferentially extending second sealing member between a circumferentially extending peripheral edge of the sealing cover and a circumferentially extending peripheral edge of the base plate to form a hermetic seal that retains the low density gas over a service lifetime of the device.

12. The device of claim 11, further comprising a layer of adhesive between the respective medial portions of the structural cover and the sealing cover.

13. The device of claim 11, wherein the structural cover has a fill port aperture extending therethrough to facilitate placement of the low density gas into the sealed housing prior to attachment of the sealing cover to the base plate by way of the second sealing member, and wherein the sealing cover and the second sealing member hermetically seal the fill port aperture.

14. The device of claim 11, wherein the first sealing member is characterized as an elastomeric seal.

15. The device of claim 11, wherein the second sealing member is characterized as an epoxy.

16. The device of claim 11, wherein the base plate comprises a recessed shoulder surface which contactingly engages the first sealing member and a raised flange extending from the recessed shoulder surface to an elevation nominally equal to an elevation of an outer surface of the structural cover.

17. The device of claim 11, wherein the sealing cover linearly extends across the outer surface of the structural cover to a raised flange.

18. The device of claim 17, wherein the sealing cover comprises a first plate portion which contactingly extends across the outer surface of the structural cover and a downwardly depending circumferentially extending flange portion that extends adjacent the raised flange of the base plate.

19. The device of claim 17, wherein the raised flange of the base plate is between the downwardly depending circumferentially extending flange portion and the structural cover.

20. The device of claim 17, wherein the downwardly depending circumferentially extending flange portion is between the raised flange of the base plate and the structural cover.

* * * * *